Nov. 6, 1951     E. M. SPLAINE     2,574,197
OPHTHALMIC LENS MOUNTING, INCLUDING FRAME ELEMENTS
Filed Dec. 26, 1947
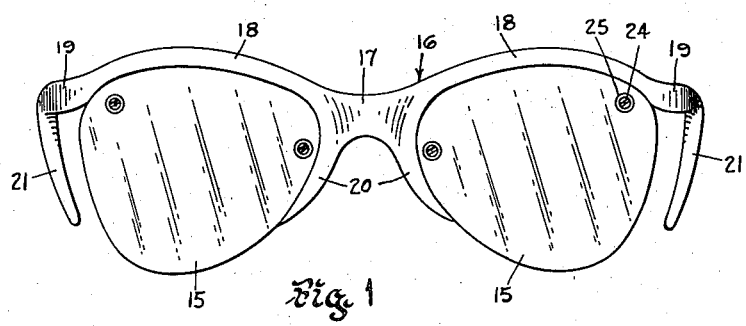
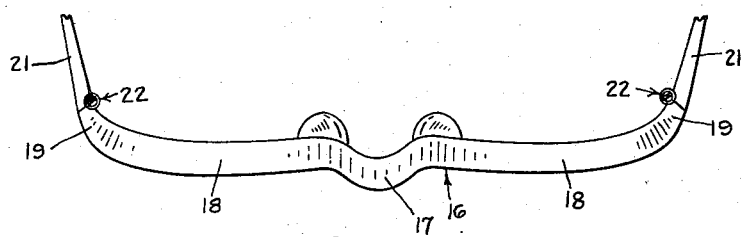
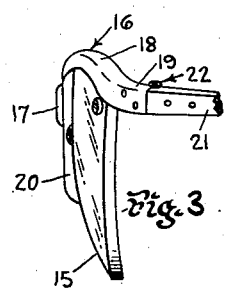
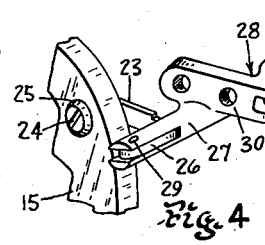
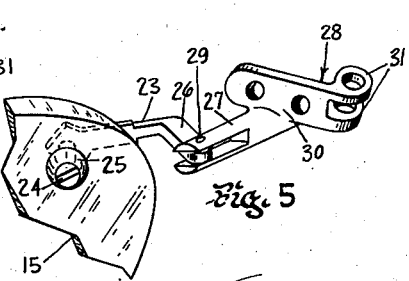
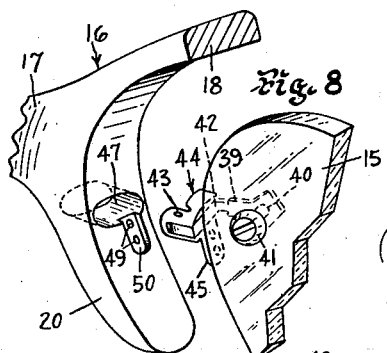
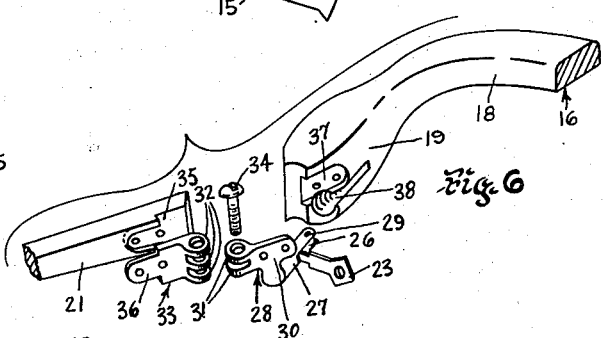
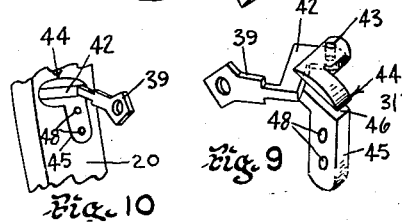
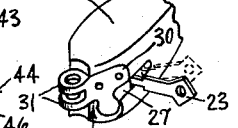
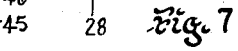
INVENTOR
EDWARD M. SPLAINE
BY
ATTORNEY Patented Nov. 6, 1951

2,574,197

UNITED STATES PATENT OFFICE 2,574,197

OPHTHALMIC LENS MOUNTING, INCLUDING FRAME ELEMENTS

Edward M. Splaine, Southbridge, Mass., assignor to American Optical Company, Southbridge, Mass., a voluntary association of Massachusetts Application December 26, 1947, Serial No. 793,909

2 Claims. (Cl. 88—41)

1

This invention relates to ophthalmic mountings and particularly to an improved lens supporting structure for such mountings.

The use of non-metallic material for the supporting structure of lenses in ophthalmic mountings is well known in the art. In this invention, the non-metallic parts are preferably formed of material having the characteristics of artificial resins which possess a relatively tough and acid-resisting nature, and which tend to be less subject to deformation from their original shapes due to changes in atmospheric or other conditions to which they may be subjected. Such materials are also exceedingly light in weight and are readily moldable or otherwise workable, and the parts composed thereof may be made to any desired color or colors.

Nevertheless, it being common knowledge that non-metallic materials of this type are generally semi-pliable or flexible in nature and easily subject to deformation or breakage, it is necessary to provide a suitable method of connecting the lenses of ophthalmic mountings to their supporting structures whereby the lenses will receive no strain or only partial strain when subjected to shock or caused to be deformed.

Therefore, it is the principal object of this invention to provide an ophthalmic mounting with a lens supporting structure of non-metallic material wherein the lens is attached to the supporting structure by resilient shock absorbing connections.

Another object is the provision in a lens supporting structure for ophthalmic mountings of a connection adapted to perform in the dual capacity of resilient lens connecting member and hinged joint connection for the temple members.

More specifically, the principal object of this invention is to provide an ophthalmic mounting possessing a lens supporting structure having partial or semi-rim sections of plastic, shell or similar non-metallic material adapted to embrace and seat the upper contour edges of the lenses, the structure being provided with novel cooperative means for securing both the lenses and temples to the rim sections in such a manner as to hold the fittings in strongly and rigidly interlocked relation to the rim sections, and whereby the lenses and non-metallic parts are so supported and secured as to be free from strain when they are manipulated.

Further objects are to provide, in a manner as hereinafter set forth, an ophthalmic mounting which is simple in its construction and arrangement, strong, durable, thoroughly efficient in its use, readily assembled, and comparatively economical to manufacture.

Other objects and advantages of the invention will become apparent from the following description taken in connection with the accompanying drawing, in which, Fig. 1 is a front elevation of an ophthalmic mounting embodying the invention;

Fig. 2 is a top plan view of the mounting illustrated in Fig. 1;

Fig. 3 is a side elevation of the same;

Fig. 4 is a perspective view showing the hinged temporal lens connection disassembled from the temple and in "closed" position;

Fig. 5 is a view similar to Fig. 4 showing the lens at an angular position opening the hinge connection;

Fig. 6 is an exploded view of the parts constituting the temporal lens and temple hinge connection;

Fig. 7 is a perspective view of the temporal lens hinge connection located in the supporting structure;

Fig. 8 is a perspective view of the nasal lens connection showing the lens and hinged connection in "ready to assemble" relation to the nasal supporting member;

Fig. 9 is a detail view showing the nasal lens hinge connection in "open" position; and Fig. 10 is a view showing the nasal lens hinge connection located in the nasal supporting member and in "closed" position.

Referring more particularly to the drawing wherein like characters of reference designate like parts throughout the sevaral views, the device embodying the invention, as illustrated in Figure 1, comprises broadly a pair of lenses 15 carried by a supporting structure or frame 16. The supporting structure 16 consists of a main bridge member 17 having integral transverse lens supporting arms 18 shaped substantially to follow the adjacent upper contour edge portions of the lenses 15 and having temple supporting end portions 19 extending slightly beyond the edge of the lenses at the temporal regions thereof. The main bridge member 17 also has depending arms 20 shaped substantially to follow the adjacent nasal contour edge portions of the lenses 15.

The temple supporting end portions 19 have suitable temples or sides 21 pivotally attached thereto as at 22, the portions 19 extending outwardly and rearwardly of the temporal ends of the transverse lens supporting arms 18 at a location substantially out of the useful field of vision when the mounting is in position of use, with the temples 21 being located adjacent this position.

The complete supporting structure 16 including the bridge member 17, transverse arms 18, depending arms 20 and temples 21, but excluding the temple pivotal connections 22, are preferably formed of non-metallic material such as zylonite, Celluloid, Bakelite or other artificial resinous material. It is to be understood that the said parts may be formed of any of the known plastic materials. The said parts, however, are preferably formed of materials having the characteristics of artificial resins which possess a relatively non-inflammable, acid-resisting nature, and which tend to be less subject to deformation from their original shapes due to changes in atmospheric or other conditions to which they may be subjected. Such materials are also exceedingly light in weight and are readily moldable or otherwise workable, and the parts composed thereof may be made to any desired color or colors.

Since it is understood that known non-metallic materials of the type preferred are generally of a semi-pliable or flexible nature and easily subject to deformation or distortion, it is necessary to provide a suitable method of resiliently connecting the lenses to the non-metallic supporting structure whereby the lenses will have transferred thereto a comparatively small amount of any shock incurred by or deformation of the structure. Such connections are provided for so attaching the lenses to the supporting structure at both the temporal and nasal regions thereof as will be hereinafter described.

In this invention there is provided movable lens supporting means combined with temple supporting means located in the temporal regions of the structure as well as cooperating movable lens supporting means located in the nasal regions of the structure.

Referring particularly to Figures 3-7, the lens 15 is carried in the usual manner by a strap 23 and is connected thereto by suitable means such as screw 24 and a spacer or washer 25, the screw 24 being inserted through the washer 25 and the lens 15 and threaded into one end of the strap 23. The strap 23 is formed with a knuckle arm 26 extending at a substantially right angle thereto, the end of the arm 26 being pivotally connected to one end of a bifurcated hinge arm 27 formed as part of the forward section 28 of the temple hinge connection 22, the end of the knuckle arm 26 being pivotally connected by pin, screw, rivet or similar means 29 within the bifurcation of the hinge arm 27 near the end thereof. Thus it will be seen that swinging movement of the lens 15 or the hinge section 28 or both will be absorbed by the pivotal connection, whereas if the connection between the hinge and the lens was rigid and unyielding, forceful movement of either of these parts would result in damage or breakage.

The forward hinge section 28 is comprised of a flat base portion 30 formed at one end with a pair of vertically spaced ears 31 having vertically aligned apertures, the ears 31 being adapted to interfit with a plurality of ears 32 similarly formed on one end of the rear hinge section 33 (Figure 6) of the temple hinge connection 28, the apertures of ears 31 and 32 being vertically aligned and adapted to receive a screw 34, one of the sets of ears 31 or 32 being threaded for proper reception of screw 34.

The inner surface of the forward end of the temple 21 is cut away as at 35 to receive the flat base portion 36 of the rear hinge section 33, the hinge section 33 being thus adapted to be located in the temple 21 flush with the inner surface thereof.

The end portion 19 of the transverse arm 18 of bridge member 16 is similarly cut away at 37 for flush reception of the base portion 30 of the forward hinge section 28, both base portions 36 and 28 being fixedly secured to their respective cooperating parts by suitable means such as screws, rivets, studs or the like, not shown.

The inner surface of the end portion 19 is also slotted as at 38 to receive the pivotal lens connection composed of the hinge arm 27 and the knuckle arm 26 when in "closed" relation. That is, when the knuckle arm 26 is positioned within the space between the bifurcations of the hinge arm 27 the extension thus formed may be inserted into the slot 38. At this time in assembling this mounting the assembler will secure the forward hinge member base portion 30 to the temple supporting end portion 19. It is to be particularly noted here, however, that the knuckle arm 26 of the lens supporting strap 23 is substantially narrower than the hinge arm 27. Therefore, when the connection is assembled in the end portion 19 of the structure, the knuckle arm 26 is permitted some pivotal action as shown in dotted outline in Figure 7.

Referring now to the nasal lens connection as illustrated in detail in Figures 8, 9 and 10, the lens 15 has a supporting strap 39 connected thereto adjacent the depending arm 20 of bridge member 17 by screw 40 and washer 41 similar to the lens temporal connection. Formed integral with the strap 39 and constituting a part thereof is a substantially L-shaped knuckle arm 42 adapted to be pivotally connected as by pin 43 to a base hinge member 44, the base hinge member 44 having a depending supporting plate 45 and a transversely disposed slot 46 (Figure 9), the slot 46 being receptive to the knuckle arm 42 which is pivotally pinned therein. The knuckle arm 42, however, is substantially smaller than the base hinge member 44 and thus is entirely free to move within the confines of the slot 46.

An opening 47 is formed on the inner surface of the depending arm 20 of the bridge member 17 and is shaped to snugly receive the base hinge member 44, the member 44 being adapted to be secured thereto and flush with the surface thereof by screws or similar means not shown inserted through openings 48 in the depending supporting plate 45 and into aligned openings 49 in the cutaway 50 provided for the plate 45. Thus, when the hinge member 44 and knuckle arm 39 are in "closed" relation the assembly can be inserted into the opening 47 and fixedly secured thereto as described to movably connect the lens to the depending arm 20 of the bridge member 17.

Thus, from the foregoing description it can be understood that the lenses 15 are movably connected to the supporting structure 16 in the nasal regions thereof by an efficient hinge connection and in the temporal regions by a combined dual purpose lens connecting and temple supporting hinge device. Therefore any deformation or shock incurred by the supporting structure 16 will be absorbed by the hinge connection rather than transmitted directly to the lenses. Also, any slight shock incurred directly by a lens will be taken up and absorbed by the connections, which is not possible when a lens is rigidly and fixedly mounted in its supporting structure, in which case breakage is likely to occur.

However, it is to be understood that several changes or modifications may be made and that although the construction is herein described as having a bridge member 17 with transverse and depending arms 18 and 20 formed integral therewith, the invention, as far as the portions which are shaped to follow substantially the upper contour shape of the lenses are concerned, might be used for different types of bridge members. It is also to be understood that although the description hereinbefore refers to the supporting structure as being made of a non-metallic material, it might be necessary to provide metallic or combined metallic and non-metallic supporting structures for lenses incorporating the herein disclosed movable hinge connections. In such structures relief would be obtanied by the lenses similar to the present construction.

It will be apparent that many changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. A lens supporting structure for the lenses of an ophthalmic mounting comprising a bridge having on its opposed sides means for connection with the nasal portion of said lenses and bar-like portions to follow the top contour of said lenses, said bar-like portions each terminating in an outwardly, rearwardly and downwardly extending end portion having an end surface as an abutment for the end of a temple and an inner side surface, said inner side surface having a relatively shallow recess therein communicating with said end surface, and a cylindrical bore extending inwardly of said inner side surface from adjacent the end surface and at an angle thereto, said cylindrical bore being disposed below and having a portion communicating with said shallow recess, and said portion having the cylindrical bore therein having a slot extending through the inner wall thereof and communicating with and extending longitudinally of the bore, the opposed walls of said slot being spaced apart a distance less than the diameter of the bore, and said end portion having a hinge member formed with a portion lying within and secured in said relatively shallow recess and having an angularly disposed portion extending within the cylindrical bore, and a lens strap member embodying an enlarged perforated ear portion adjacent one end thereof adapted to be secured to a side surface of a respective lens and having an angularly disposed portion adjacent its opposed end extending through the slotted wall and pivotally connected to the portion of the hinge member extending within the cylindrical bore for movement about an axis disposed substantially in the direction of the plane in which the lenses are to be supported and substantially normal to the walls of said slot extending through the inner surface of said end portion.

2. A lens supporting structure for the lenses of an ophthalmic mounting comprising a bridge having on its opposed sides means for connection with the nasal portion of said lenses and bar-like portions to follow the top contour of said lenses, said bar-like portions each terminating in an outwardly, rearwardly and downwardly extending end portion having an end surface as an abutment for engaging the end of a temple and an inner side surface, said inner side surface having a relatively shallow recess therein communicating with said end surface, and a cylindrical bore extending inwardly of said inner side surface at an angle thereo, said cylindrical bore having its opening spaced from the end surface and disposed below and communicating with said shallow recess, and said portion having the cylindrical bore therein having a slot extending through the inner wall thereof and communicating with and extending longitudinally of the bore, the opposed walls of said slots being spaced apart a distance less than the diameter of said bore, and said end portion having a hinge member embodying a plate-like portion lying within said relatively shallow recess and having an angularly disposed portion extending within the cylindrical bore with one end secured to the lower edge of the plate-like portion intermediate its ends, said plate-like portion having a pair of perforations on opposed sides of said point of securement of the angularly disposed portion with the plate-like portion, and means extending through said perforations and into the body of the end portion to secure said hinge member thereto, and a lens strap member embodying an enlarged perforated ear portion adjacent one end thereof adapted to be secured to a side surface of a respective lens and having an angularly disposed portion adjacent its opposed end extending through the slotted wall and pivotally connected to the portion of the hinge member extending within the cylindrical bore for movement about an axis disposed substantially in the direction of the plane in which the lenses are to be supported and at approximately right angles to the said slot extending through the inner surface of said end portion.

EDWARD M. SPLAINE.

REFERENCES CITED

The following references are of record in the file of this patent:

UNITED STATES PATENTS

| Number | Name | Date |
|---|---|---|
| 2,301,328 | Rochte | Mar. 10, 1942 |
| 2,355,053 | Carlson | Aug. 8, 1944 |
| 2,357,267 | Rohrbach | Aug. 29, 1944 |
| 2,436,606 | Rohrbach | Feb. 24, 1948 |
| 2,463,956 | Ellestad | Mar. 8, 1949 |
| 2,474,119 | Rohrbach | June 21, 1949 |

FOREIGN PATENTS

| Number | Country | Date |
|---|---|---|
| 819,833 | France | July 19, 1937 |